(No Model.)

L. HUGRON.
METALLIC ROD PACKING.

No. 268,678. Patented Dec. 5, 1882.

Witnesses.
Edw. J. Brady
Theo. L. Popp

L. Hugron, Inventor.
By Wilhelm & Bonner,
Attorneys.

UNITED STATES PATENT OFFICE.

LOUIS HUGRON, OF BUFFALO, NEW YORK, ASSIGNOR OF TWO-THIRDS TO EMMETT B. COOK AND MICHAEL BOWLES, BOTH OF SAME PLACE.

METALLIC ROD-PACKING.

SPECIFICATION forming part of Letters Patent No. 268,678, dated December 5, 1882.

Application filed July 24, 1882. (No model.)

*To all whom it may concern:*

Be it known that I, LOUIS HUGRON, of the city of Buffalo, in the county of Erie and State of New York, have invented new and useful Improvements in Metallic Rod-Packings, of which the following is a specification.

This invention has reference to that class of metallic packings in which tapering rings are seated in a tapering stuffing-box and tightened against the seat and the piston-rod or other part passing through the rings by the pressure of the steam or other fluid pressing against the largest end of the system of packing-rings.

The object of this invention is to construct a simple packing of this character in which the rings are pressed tightly against the parts to be packed solely by the pressure of the fluid, and which can be readily taken apart when required for renewing any of its parts.

My invention consists of the particular construction of the packing, which will be hereinafter fully set forth and pointed out in the claims.

Figure 1:
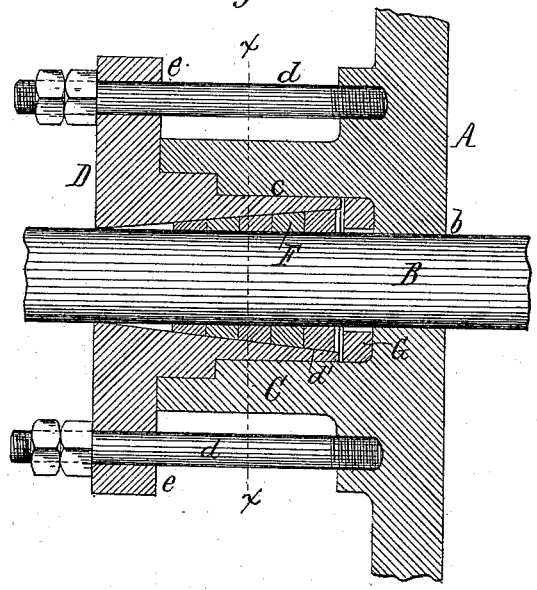
Figure 2:
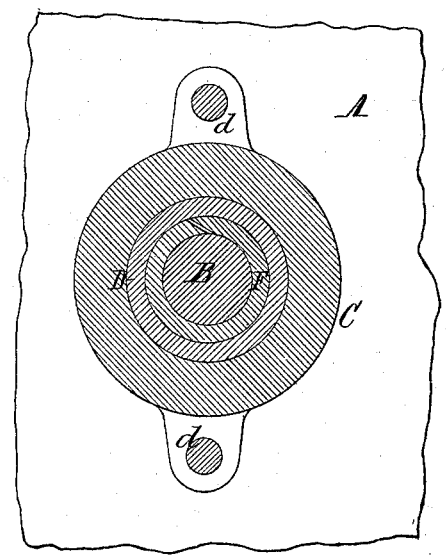
Figure 3:
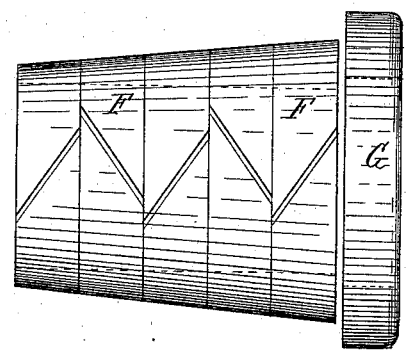

In the accompanying drawings, Figure 1 is a longitudinal section of my improved packing. Fig. 2 is a cross-section in line $x\ x$, Fig. 1. Fig. 3 is an elevation on an enlarged scale of the metallic packing-rings.

Like letters of reference refer to like parts in the several figures.

A represents the head of the steam-cylinder, valve-chest, or other part to which the packing is applied; and B represents the piston-rod, valve-stem, or other moving part, which passes through an opening, $b$, in the head A.

C represents the socket portion of the stuffing-box, which is formed with the head A; and D is the gland, which is inserted into the cylindrical bore $c$ of the socket portion C, and secured in place by bolts $d$, passing through the flanges $e$ of the gland. The outer end of the portion C and that portion of the gland bearing against the same are ground or otherwise prepared to form a tight joint when drawn against each other by the bolts $d$. The gland D is turned out conically on its inner side, with the large end of the bore turned toward the head A, as clearly shown at $d'$ in Fig. 1.

F represents a number of packing-rings, turned out cylindrically on their inner sides to fit around the rod B, and turned out conically on their outer sides to fit in the conical bore of the gland D. These rings are constructed of Babbitt metal, or some other suitable metal which possesses the requisite strength and smoothness. Each ring is divided, preferably by an oblique cut, and the cuts in the adjacent rings run in opposite directions, as clearly shown in Fig. 3, to prevent as much as possible the cuts from forming accidentally a continuous passage from end to end of the packing, which would permit the fluid to escape through the packing.

G represents a square packing-ring, arranged loosely in the cylindrical bore $c$ of the socket portion C of the stuffing-box, in which the cylindrical portion of the gland D is fitted. The ring G bears against the inner end of the bore $c$ and fits with its outer surface snugly against the inner surface of said bore, but leaves a space around the rod B, through which the steam or other fluid passes from the opening $b$ against the inner or large end of the system of packing-rings F. The ring G protects the conical face of the packing-rings and prevents the steam or other fluid from coming first in contact with the same, which would result in a compression of the rings and in leakage of steam or other fluid through the stuffing-box. The ring G directs the steam or other fluid against the broad end of the innermost ring, F, near the rod B, whereby the pressure is applied to the rings near the rod B, and a tight fit of the rings F in the conical bore of the gland and against the rod B is obtained, and leakage prevented.

My improved packing is very simple in construction and will wear a long time without requiring any attention, as it dispenses with all springs or other tightening devices, but relies solely upon the pressure of the fluid to tighten the packing-rings, and it does away with the cost and labor attending the frequent repacking which is required in ordinary stuffing-boxes.

Upon releasing the bolts $d$ and withdrawing the gland D from the socket C of the stuffing-box, the packing-rings F and G are exposed and easily removed, if required.

I claim as my invention—

The combination, with the head A, provided with a socket, C, having a cylindrical bore, c, of a gland, D, provided with a bore, d', tapering outwardly, conical packing-rings F, fitted in the bore d' and around the rod B, and a loose ring, G, seated in the inner end of the bore c, with its periphery against the wall thereof, and provided with an annular steam-passage surrounding the rod B, whereby the steam is directed against the packing-rings near the rod and prevented from first striking the packing-rings near their periphery, substantially as set forth.

LOUIS × HUGRON.
his mark.

Witnesses:
MICHAEL BOWLES,
CHAS. F. GEYER.